March 21, 1967
W. W. KENNEDY
3,310,234
AIR MIXING DEVICE
Filed June 30, 1965
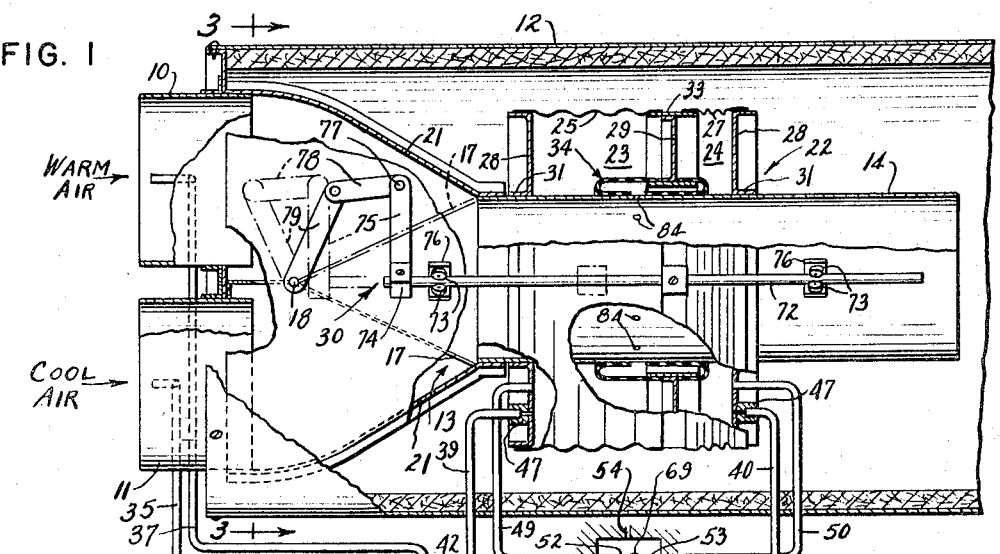
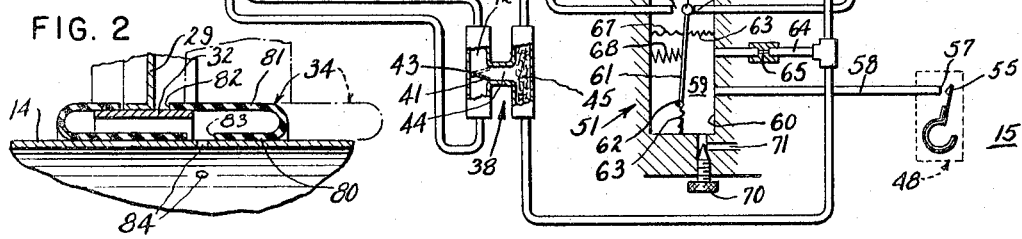
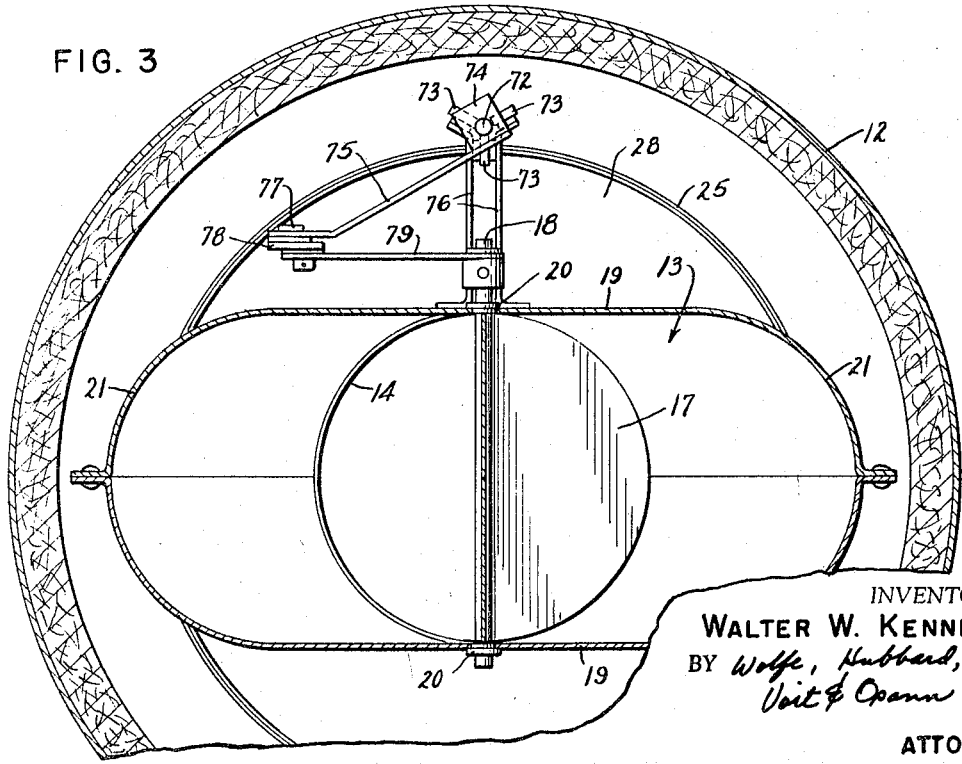
INVENTOR.
WALTER W. KENNEDY
BY Wolfe, Hubbard,
Voit & Osann
ATTORNEYS

3,310,234
AIR MIXING DEVICE

Walter W. Kennedy, Rockford, Ill., assignor to Barber-Colman Company, Rockford, Ill., a corporation of Illinois
Filed June 30, 1965, Ser. No. 468,363
10 Claims. (Cl. 236—13)

This invention relates to a device for controlling the relative amounts of warm and cool air admitted under pressure from separate sources of supply to a mixed air duct to maintain the temperature of the room space serviced by the system substantially at a selected temperature.

The primary object of the invention is to utilize the pressure of the supply air to provide the force for variably positioning a mixing damper to proportion the relative flows of warm and cool air and obtain the desired temperature of the mixture.

Another object is to regulate the mixing of the air from two streams by a single valve actuated by the pressure differential between the two interiors of hollow and axially expansible and contractible bellows acting to position the valve in accordance with the desired proportion of warm and cool air flows.

A more detailed object is to arrange the two bellows end to end on opposite sides of and connected to a common movable wall variably positioned axially of the bellows in accordance with the pressure differential in the bellows, and to position the valve in accordance with the position of this wall.

Another important object is to support the movable wall in sealed telescoped relation with the air duct in a novel manner for free axial floating along the duct in response to changes in the pressure acting on the wall.

A further object is to provide an effective air mixing device of the foregoing character in which both the mixing valve and the actuator therefor are relatively simple and inexpensive in construction and operation.

Other objects and advantages of the invention will become apparent from the following detailed description taken in connection with the accompanying drawings, in which FIGURE 1 is a fragmentary plan view of a mixing device embodying the novel features of the present invention with parts broken away and shown in cross-section for clarity of illustration.

FIG. 2 is an enlarged fragmentary view of a portion of FIG. 1 with the parts in moved positions.

FIG. 3 is an enlarged fragmentary cross-sectional view taken substantially along the line 3—3 of FIG. 1.

As shown in the drawings for purposes of illustration, the invention is incorporated in a device for varying the proportions of streams of warm and cool air delivered at suitable pressures through side-by-side inlet ducts 10 and 11 at one end of a casing 12 into a chamber 13 where the selected proportions of the two streams are mixed together and discharged through a duct 14 extending through the casing and communicating with the usual air outlets (not shown) through which the mixed air is discharged into a room space 15 to be conditioned. The air flow through the mixing chamber is regulated by a vane damper 17 disposed in a vertical plane and fastened along one edge to a horizontal pintle 18 spanning the upper and lower walls 19 of the mixing chamber between the inlets as shown in FIG. 3 and journaled in bearings 20 on the side walls. The damper extends downstream from the pintle and is shaped to swing within the chamber between the positions shown in full and in broken lines in FIG. 1.

In the first position, the damper 17 closes the cool air inlet 11 and leaves the warm air inlet 12 fully open, while in the second position, the warm air inlet is closed and the cool air inlet is open. In intermediate positions of the damper, the proportion of warm and cool air depends upon the ratio of the areas of the passages defined around opposite sides of the damper between the latter and the converging side walls 21 of the chamber. Thus, by selective positioning of the damper about its pivotal axis, the desired proportion of the warm and cool air streams and the temperature of the mixed air in the duct 14 can be selected and controlled.

In accordance with the present invention, the actuator 22 for variably positioning the damper 17 comprises two axially expansible and contractible chambers 23 and 24 defined by bellows 25 and 27 arranged in end-to-end relation with the remote ends of the bellows closed by fixed end walls 28 and the adjacent ends connected to and sealed around the outer portion of a central divider 29 forming a common and movable wall of the two chambers. The divider is connected to the damper by linkage indicated generally at 30 for positioning the damper in accordance with the position of the divider. Thus, by regulating the pressures in the chambers 23 and 24 in accordance with temperature changes in the room space 15, the movable wall is shifted back and forth automatically to position the damper to produce the desired temperature of the mixed air discharged through the duct 14.

In this instance, the duct 14 is an elongated tube of circular cross-section telescoped at its left end into the open end of the mixing chamber and projecting to the right therefrom. The fixed end walls 28 of the chambers 23 and 24 are disks of U-shaped radial cross-section having flanged central openings 31 telescoping snugly over the duct and secured thereto in axially spaced relation, and the divider 29 is formed by a similar disk having a center hole defined by a ring 32 secured to the disk and sized to telescope loosely over the duct with substantial clearance around the latter. The outer periphery of the divider is formed by a second ring 33 telescoped over and secured to the outer flange of the disk.

To form the bellows 25 and 27, two axially corrugated sleeves composed of rubberized fabric or other endwise flexible material, preferably reinforced against radial reflection, are secured at their opposite ends to the outer portions of the fixed disks 28 and to the ring 33 to cooperate with the disks and the duct 14 in defining the two axially expansible and contractible chambers 23 and 24 which thus are toroidal in shape. Herein, the remote ends of the sleeves are telescoped snugly over and cemented to the flanges at the outer peripheries of the disks 28 and their adjacent ends are telescoped over and cemented to the opposite end portions of the ring 33 thereby closing and sealing both ends of the sleeves. The inner portion of the movable disk 29 is sealed around the duct by a member 34 that supports the disk for free axial floating along the duct.

The pilot pressure for operating the valve actuator 22 is derived from the air supplied to the mixing chamber 13 through the inlets 10 and 11. For this purpose, pipes 35 and 37 opening upstream in the two inlets lead into a device 38 for directing the higher of the two inlet pressures to both of the pressure chambers 23 and 24 through pipes 39 and 40 opening through the disks 28 into the respective chambers. Herein, this device includes a vane 41 (FIG. 1) suspended within a chamber 42 from a pivot 43 and exposed on opposite sides to the warm and cool pilot pressure streams flowing into the opposite ends of the chamber. With this arrangement, the vane swings away from the higher pressure and across an outlet passage 44 to one of the limit positions shown in full and in phantom in FIG. 1, the full line position being that taken when the warm air pressure in the pipe 37 is the higher. From the outlet passage, the higher pilot pressure air flows through a filter 45 and the pipes 39, 40 to the pressure chambers 23, 24 through restrictions 47 for limiting the volume of air flow. The pressure thus produced in the chambers provides the forces for biasing the movable divider wall 29 in one direction or the other along the duct 14.

To develop a pressure differential on opposite sides of the divider wall 29, a thermostat 48 is used to control the escape of air from the outlet pipe 49, 50 of one or both of the chambers 23, 24 at rates varying with the prevailing temperature at the thermostat. While this escape may be controlled directly by the thermostat, accurate control and low cost of construction may be achieved by utilizing the thermostat to control the energization of a relay 51 for operating escape valves 52 and 53 thereby controlling the communication between the outlet pipes and a low pressure escape passage 54. Herein, a projection 55 on the tongue of the thermostat cooperates with an orifice 57 at the end of a leak tube 58 to form a valve regulating the rate of leakage of air out of the chamber 59 of a bellows formed by one side 60 of the relay casing, a vane 61 swingable in the chamber about a fulcrum 62, and two flexible walls 63 extending from the casing walls to the pivot 62 and to the vane near the free end thereof. Air at the higher of the two inlet pressures is supplied to the bellows chamber through a tube 64 communicating with the pipe 40 and leading to the bellows through a flow limiting restriction 65. A flexible wall 67 connects the other side of the vane and the other casing wall so that the valves 52, 53 are disposed within a chamber communicating with the outlet tubes 49, 50 and the escape passage 54 which is at atmospheric pressure. A light compression spring 68 urges the vane in a direction to collapse the bellows chamber 59 and close the valve 53 as shown in FIG. 1.

In this instance, the valves 52 and 53 are formed by a ball 69 on the free end of the vane 61 coacting with the respective ends of the tubes 49 and 50 which, when open, establish unrestricted communication between the valve chamber and the respective pressure chambers 23 and 24. By properly correlating the force of the spring 68 with the area of the vane 61 which is exposed to the pressure supplied to the chamber 59 through the tube 64, the ball will be centered between the ends of the outlet pipes and both valves 52, 53 will be open when air leaks out of the chamber 59 at a rate equal to the delivery of air to the chamber through the tube 64. Such correlation is achieved by adjusting a needle valve 70 controlling the rate of escape of air out of the bellows chamber 59 through a by-pass 71.

To transmit the motion of the divider 29 to the damper 17, the outer ring 33 of the divider is adjustably clamped above the divider to an elongated link or rod 72 which parallels the direction of back and forth motion of the divider and is guided between longitudinally spaced sets of rollers 73 for substantially free endwise sliding, the rollers being journaled on the upper ends of brackets 76 upstanding from the top of the duct on opposite sides of the actuator 22. The left end of the rod is fast on a clamp 74 on one end of a link 75 inclined downwardly and to the left (FIG. 3) from the rod and fastened at 77 to one end of a horizontal link 78 which is pivotally connected to the free end of a link 79 fast on and projecting radially outwardly from the pintle 18. Thus, as the divider moves to the left from the position in FIG. 1, it slides the rod endwise to the left to shift the bell crank formed by the links 75 and 78 toward the dotted-line position in FIG. 1 thereby rotating the link 79 and the damper counterclockwise about the axis defined by the pintle and toward the dotted-line position of the damper. In this position, the warm air inlet 10 is fully closed. Return motion of the divider toward the right swings the damper toward its full line position in which the cool air inlet 11 is closed.

In accordance with another important aspect of the invention, the member 34 forming the seal between the duct 14 and the inner portion of the movable divider wall 29 is formed in a novel manner to permit substantially unrestricted floating motion of the divider along the duct to minimize resistance to operation of the damper 17 in response to pressure changes in the chambers 23 and 24. For this purpose, the supporting and sealing member is an annular tube composed of freely flexible material such as rubber wrapped around the duct and flattened axially of the duct to form radially spaced inner and outer walls 80 and 81 of substantial axial width. The ring 32 is disposed just inside the outer wall and is cemented thereto on opposite sides of a central circumferential split 82 in the outer wall to hold the two sections of this wall together while sealing the interior of the tube and securing the divider to the outer wall midway between the axially spaced sides of the tube when the divider is midway between the fixed end walls 29 of the bellows chambers. The inner wall 80 is formed with an annular opening 83 (see FIG. 2) communicating with bleed holes 84 through the duct wall to admit air from the duct into the interior of the tube, and is secured to the duct on opposite sides of this opening.

Thus, the pressure of the mixed air flowing through the duct 14 holds the tube walls 80 and 81 in spaced relation to support the divider 29 in spaced but sealed relation with the outside of the duct. As the divider is urged in one direction or the other along the duct, the tube 34 flexes and rolls in the manner of a tank or tractor track to carry the divider along the duct, the only resistance to such movement being the resistance to flexing of the tube and the slight frictional resistance in the linkage 30 and the mounting of the damper 17.

When, in operation, the parts are positioned as shown in FIG. 1, the warm air inlet 10 is open and the cool air inlet 11 is completely closed so that only warm air flows through the mixing chamber 13 and into the duct 14. Let it be assumed that the temperature at the thermostat 48 has risen above the setting of the thermostat, and that the warm air is at the higher pressure thus holding the vane 41 in the position shown in full in FIG. 1. The leak valve of the thermostat is open, allowing the spring 68 of the relay 51 to swing the vane 61 clockwise about its pivot 62 and close the valve 53. With the valve 52 open, air escapes freely from the left chamber 23 while the escape from the other chamber 24 is blocked so that a pressure differential builds up across the divider wall 29 and initiates movement of the latter to the left to swing the damper counterclockwise about the pintle 18 and begin opening the cool air inlet while correspondingly reducing the effective area of the warm air inlet.

In this manner, the temperature of the air mixture discharged into and through the duct 14 is reduced and, when this temperature change is effective at the thermostat, the leak valve thereof starts to close, thus building up a back pressure in the bellows chamber 59 sufficient to swing the vane 61 counterclockwise against the force of the spring 68 to open the valve 53 and start to close the valve 52, reducing the escape of air from the chamber 23 as the rate of escape from the chamber 24 begins to increase. The movement of the divider wall and the damper is interrupted when the room temperature attains a value at which the pressure in the relay chamber 59 balances the spring force with both the relay valves 52, 53 open.

Should the temperature at the thermostat 48 fall below the desired value, the closing of the leak valve by movement of the projection 55 toward the orifice 57 increases the back pressure in the relay chamber 59 and thereby swings the vane 61 counterclockwise from the balanced position toward the pipe 49. Restriction of the escape of air from the chamber 23 causes a predominating pressure to develop therein and initiate movement of the divider wall 29 back to the right to rotate the damper 17 clockwise and correspondingly increase the warm air in the mixture. Such damper movement continues until equilibrium conditions are restored at the relay.

It will be seen that the flexible tube 34 rolls freely in both directions along the duct 14 to support the divider 29 for back and forth floating along the duct while effectively sealing the clearance between the ring 32 and the duct. During such movement, the motion of the divider is transmitted directly to the damper 17 to produce the desired changes in warm and cool air proportions and maintain the room temperature substantially at the temperature selected. The result is an effective air mixing device in which both the mixing valve and the actuator therefor are relatively simple and inexpensive in construction and operation.

I claim as my invention:

1. In an air mixing device, the combination of, an elongated tubular air duct for carrying a flow of air under pressure and having an inlet end, means defining a chamber enclosing said inlet and having separate warm and cool air inlets for the admission of air into opposite side portions of said chamber, a valve disposed in said chamber and movable back and forth therein to increase and decrease the relative amounts of warm and cool air delivered to said duct, first and second axially expansible and contractible bellows telescoped over said duct and disposed in end-to-end relation, means closing the remote ends of said bellows and securing the latter to said duct, an annular disk telescoped loosely over said duct and disposed between said bellows, a member forming a seal between said duct and the inner portion of said disk and supporting the disk for axial floating along the duct, the adjacent ends of said bellows being secured to and sealed around the outer portion of said disk to cooperate with the latter and said duct to define first and second toroidal pressure chambers on opposite sides of the disk, means establishing communication between said air inlets and both of said chambers whereby air from the inlets is admitted into both chambers, each of said pressure chambers having an air outlet, a thermostat having an element movable back and forth with changes in the temperature of the mixed air delivered through said duct, valve means controlled by said thermostat and operable to vary the escape of air through said outlets in accordance with changes in said mixed air temperature thereby to establish between the chambers a pressure differential for moving said disk along said duct, and linkage connecting said disk to said valve and transmitting the motion of the disk to the valve to position the latter in accordance with the position of the disk thereby to vary the relative amounts of warm and cool air admitted into said duct in response to movements of said thermostat element.

2. The combination defined in claim 1 in which said member is an annular tube of flexible material wrapped around said duct and flattened axially of the duct to form inner and outer radially spaced walls of substantial axial width, the inner portion of said disk being secured to and sealed around said outer wall intermediate the axially spaced sides of the latter whereby said tube is adapted to roll along said duct and support said disk for axial floating during such rolling.

3. The combination defined in claim 2 in which said duct and said tube are formed with alined openings for admitting air from the duct into the tube to maintain said walls in spaced relation.

4. The combination defined in claim 1 in which said inlets are side by side and said valve is a vane damper pivoted in said chamber for swinging across said inlets from a first position in which said cool air inlet is closed and said warm air inlet is open to a second position in which said cool air inlet is open and said warm air inlet is closed, said linkage including a first link movable axially of said duct with said disk and a crank carried by said link and connected to said damper to shift the latter between said first and second positions as said disk moves back and forth.

5. In an air mixing device, the combination of, an air duct for carrying a flow of air under pressure and having an inlet end, means defining a chamber communicating with said inlet end and having separate inlets for the admission of warm and cool air into said chamber and thus into said duct, a valve disposed within said chamber and movable back and forth therein to progressively increase and decrease the relative amounts of warm and cool air delivered to said inlet end, first and second expansible and contractible bellows disposed end to end and having a common movable wall closing the adjacent ends of said bellows and fixed end walls closing the remote ends of the bellows thereby to define first and second pressure chambers within the bellows and on opposite sides of said movable wall, means establishing communication between said air inlets and both of said chambers whereby air from said inlets is admitted into the chambers, a thermostat having an element movable back and forth with changes in the temperature of the mixed air delivered through said duct, valve means controlled by said thermostat and operable to regulate the escape of air from said chambers and thereby establish between the chambers a pressure differential for moving said common wall back and forth and positioning the same in accordance with said mixed air temperature, and means connecting said common wall to said valve to position the latter in accordance with said wall position thereby to vary the relative amounts of warm and cool air as said wall moves back and forth.

6. The combination of, a tubular duct, two axially expansible and contractible bellows telescoped over and spaced from said duct in end-to-end relation, an annular divider telescoped loosely over said duct and disposed between said bellows with its outer periphery fastened to the adjacent ends of the bellows to close the latter and for movement of said divider axially along the duct during expansion of one bellows and simultaneous contraction of the other, an annular tube of flexible material wrapped around said duct and flattened axially of the duct to form inner and outer radially spaced walls of substantial axial width, and means for applying the pressure of air flowing through said duct to the interior of said tube, said walls being secured intermediate their axially spaced sides to said duct and said divider for limited rolling motion of the tube along said duct and free axial floating of said divider along the duct in response to expansion and contraction of said bellows.

7. The combination defined in claim 6 in which said outer wall is formed with a central circumferential split through which the inner portion of said divider projects, said divider having a ring fast on its inner periphery and sealingly secured to said outer wall on opposite sides of said split.

8. The combination defined in claim 6 in which the means for applying pressure to said tube is an annular opening in said inner wall in continuous communication with holes through said duct.

9. In a mixing device, the combination of, a tubular air duct, an axially expansible and contractible bellows telescoped over and spaced from said duct, a fixed end wall closing one end of said bellows, an annular member loosely telescoped over said duct and sealed adjacent its outer periphery to said bellows, a tube of flexible material disposed around said duct and flattened axially thereof to form inner and outer radially spaced walls of substantial axial width held in spaced apart relation by air within said tube, the inner periphery of said member being secured to and sealed by said outer wall between the axially spaced sides thereof and thus supported in spaced and free floating relation with said duct for back and forth axial movement of said member during expansion and contraction of said bellows.

10. The combination defined in claim 9 in which said inner wall is secured intermediate its axially spaced sides to said duct and is formed with at least one opening communicating with the interior of said duct whereby air flowing through said duct holds said walls apart.

References Cited by the Examiner
UNITED STATES PATENTS

| | | | |
|---|---|---|---|
| 2,233,871 | 3/1941 | Parsons | 236—12 |
| 2,997,240 | 8/1961 | Kreuttner | 236—13 |

ALDEN D. STEWART, *Primary Examiner*.